(12) United States Patent
Yuen et al.

(10) Patent No.: US 12,305,940 B2
(45) Date of Patent: May 20, 2025

(54) TUBE AND TUBESHEET ASSEMBLY WITH DAMAGE RESISTANCE AND METHOD FOR PROTECTING TUBE AND TUBESHEET ASSEMBLIES FROM DAMAGE

(71) Applicant: Suncor Energy Inc., Calgary (CA)

(72) Inventors: Simon Yuen, Calgary (CA); Yasin Suzuk, Fort McMurray (CA); Duane Go Serate, Calgary (CA)

(73) Assignee: Suncor Energy Inc., Calgary (CA)

( * ) Notice: Subject to any disclaimer, the term of this patent is extended or adjusted under 35 U.S.C. 154(b) by 553 days.

(21) Appl. No.: 16/948,204

(22) Filed: Sep. 8, 2020

(65) Prior Publication Data
US 2022/0074684 A1   Mar. 10, 2022

(51) Int. Cl.
| | |
|---|---|
| *F28F 9/18* | (2006.01) |
| *B23K 1/00* | (2006.01) |
| *B23K 9/028* | (2006.01) |
| *B23P 15/26* | (2006.01) |
| *B23K 101/14* | (2006.01) |

(52) U.S. Cl.
CPC ............ *F28F 9/182* (2013.01); *B23K 1/0012* (2013.01); *B23K 9/0288* (2013.01); *B23P 15/26* (2013.01); *B23K 2101/14* (2018.08); *F28F 2245/00* (2013.01); *F28F 2275/06* (2013.01)

(58) Field of Classification Search
CPC .......... F28F 9/182; F28F 9/16; F28F 2245/00; F28F 2275/06; F28F 19/002; B23K 1/0012; B23K 9/0288; B23K 2101/14; B23P 15/26; F16L 58/08; F16L 58/1036
See application file for complete search history.

(56) References Cited

U.S. PATENT DOCUMENTS 1,252,585 A * 1/1918 Kinnane et al. ...... F16L 41/001
                                                        29/890.051
2,270,864 A * 1/1942 Emilien .................... F28D 7/16
                                                        165/148
(Continued)

FOREIGN PATENT DOCUMENTS

DE       2816002 A1    10/1979

OTHER PUBLICATIONS

First Office Action issued in related Canadian Patent Application No. 3,092,394 dated Dec. 7, 2022.
(Continued)

*Primary Examiner* — Tho V Duong
(74) *Attorney, Agent, or Firm* — CPST Intellectual Property Inc.; Brett J. Slaney (57) ABSTRACT

A tube and tubesheet assembly is provided, which includes a tubesheet, the tubesheet comprising at least one tube insertion aperture therethrough; at least one tube inserted in the at least one tube insertion aperture; and a damage-resistant layer applied to an edge of the at least one tube and along an inner surface of a portion of the tube that is positioned within the corresponding tube insertion aperture. A heat exchanger including the assembly is also provided. A method is also provided for coupling a tube to a tubesheet. The method includes applying a damage-resistant layer to an edge of the tube and along an inner surface of a portion of the tube that is positioned within a tube insertion aperture in the tubesheet. The method can also be used to repair tubes and retrofit pre-existing tube-to-tubesheet joints.

79 Claims, 10 Drawing Sheets

(56) References Cited

U.S. PATENT DOCUMENTS

| | | | | | |
|---|---|---|---|---|---|
| 2,516,689 | A | * | 7/1950 | France | B21C 37/154 |
| | | | | | 29/523 |
| 2,735,698 | A | * | 2/1956 | Brinen et al. | F28F 9/167 |
| | | | | | 29/523 |
| 3,317,222 | A | * | 5/1967 | Maretzo | F28F 9/182 |
| | | | | | 285/55 |
| 3,592,261 | A | * | 7/1971 | Black | F28F 19/002 |
| | | | | | 285/213 |
| 4,579,087 | A | * | 4/1986 | Stol | F22B 37/104 |
| | | | | | 285/55 |
| 5,385,645 | A | * | 1/1995 | Li | B01D 1/222 |
| | | | | | 159/DIG. 7 |
| 6,318,094 | B1 | * | 11/2001 | Yundt, Jr. | F28F 19/06 |
| | | | | | 62/71 |
| 7,574,981 | B1 | * | 8/2009 | Schulz | F28D 7/16 |
| | | | | | 122/235.12 |
| 8,210,245 | B2 | | 7/2012 | Gillessen et al. | |
| 8,640,337 | B2 | * | 2/2014 | Muroya | B21D 39/06 |
| | | | | | 29/890.038 |
| 9,435,481 | B2 | * | 9/2016 | Bienentreu | F22B 37/107 |

OTHER PUBLICATIONS

Ju, Feng et al.; "Sulfidation Rate Prediction on Tube-to-tubesheet Joints in a Waste Heat Boiler in Sulphur Plant"; Proceedings of the ASME 2018 Pressure Vessels & Piping Conference; Jul. 15-20, 2018, Prague, Czech Republic; PVP2018-85070.

\* cited by examiner

TUBE AND TUBESHEET ASSEMBLY WITH DAMAGE RESISTANCE AND METHOD FOR PROTECTING TUBE AND TUBESHEET ASSEMBLIES FROM DAMAGE

TECHNICAL FIELD

The following relates generally to tube and tubesheet assemblies, such as in heat exchangers, and more specifically to tube and tubesheet assemblies that require damage resistance. The following also relates to methods for protecting tube and tubesheet assemblies from such damage.

BACKGROUND

A "shell and tube" heat exchanger refers to a heat exchanger which is constructed using tubesheets and a set of heat transfer tubes joined at each end between the tubesheets. The tube and tubesheet assembly is then hermetically sealed within a shell with bonnets or heads secured to each end of the shell to provide an inlet and an outlet to feed fluids through the tubes. The shell and tube heat exchanger can be used to perform various types of heat transfer functions, such as heating, cooling, condensing, and evaporating.

One fluid flows through the tubes, also referred to as the "tube side" and another fluid flows around and outside of the tubes but within the shell, also referred to as the "shell side". Heat is transferred between the different fluids. For example, a relatively cooler fluid such as water can be passed through the shell for the purpose of either heating the relatively cooler fluid or cooling the other fluid fed through the tube side. Baffle plates can be used in the shell to direct the shell side fluid to flow in a winding or "zigzag" path. The tubes are secured to the tubesheets at each end to prevent the fluid inside the tubes from mixing with the fluid outside of the tubes (and inside the shell). Various fluids can be fed through the tube side of the shell and tube heat exchanger, for example a relatively hot gas.

Conventional shell and tube heat exchangers often use carbon steel tubes that have a rolled or welded joint located at the hot-side face of the tubesheet. With this configuration, the tube ends and their welds are exposed to the tubeside fluid temperatures, rather than a weighted average between the two streams. This can result in higher temperatures, which can result in higher corrosion rates. Moreover, there can be generally higher turbulence at the tube ends, which can accelerate the damage mechanisms, such as corrosion and erosion.

For example, in waste heat boilers in a sulfur plant, sulfidation corrosion can result from the chemical reaction between the carbon steel (or alloy) and sulfur compounds at high temperatures. In sulfur recovery plants, sulfidation corrosion of the carbon steel tubes at the tube-to-tubesheet joint can govern the life of the waste heat boilers.

SUMMARY

Tube joints can suffer wall loss at an excessive rate for several reasons, such as high metal temperature corrosion as one example. Other forms of wall loss damage can include, without limitation, erosion, acid attack, stress corrosion cracking, pitting, and metal dusting. It can be appreciated that while certain examples that follow focus on corrosion, the principles discussed herein equally apply to other such damage or degradation mechanisms. An increase temperature of this joint can result from various factors, such as fouling and scale formation on the shell side, excessive heat duty, or deterioration or failure of the refractory system on the hot face of the tubesheet, to name a few. For example, a tube joint corroded by sulfidation corrosion can result in tube thinning in the section of the tube contained within the tubesheet, while the remaining tube length remains intact. The face of the tubesheet as well as the weld beads can also show signs of corrosion in this example. Refractory dust entrained with liquid sulfur can also contribute to the thinning of the tube ends by erosion or erosion-corrosion.

To address issues of wall loss and other damage to a tube and tubesheet joint, a damage-resistant layer can be applied to an edge of a tube to be joined to a tubesheet, and extending along the inner surface of the tube to a desired depth, positioned within the corresponding tube insertion aperture of the tubesheet.

In one aspect, there is provided a tube and tubesheet assembly, comprising: a tubesheet, the tubesheet comprising at least one tube insertion aperture therethrough; at least one tube inserted in the at least one tube insertion aperture; and a damage-resistant layer applied to an edge of the at least one tube and along an inner surface of a portion of the tube that is positioned within the corresponding tube insertion aperture.

In another aspect, there is provided a heat exchanger, comprising: a pair of tubesheets; a plurality of tubes extending between the pair of tubesheets, each tube being inserted the tubesheets at respective tube insertion apertures; and for at least one tube-to-tubesheet connection, a damage-resistant layer applied to an edge of the corresponding tube and along an inner surface of a portion of the corresponding tube that is positioned within the corresponding tube insertion aperture.

In yet another aspect, there is provided a method of coupling a tube to a tubesheet, comprising: applying a damage-resistant layer to an edge of the tube and along an inner surface of a portion of the tube that is positioned within a tube insertion aperture in the tubesheet.

In yet another aspect, there is provided a method of repairing a tube in a shell and tube heat exchanger, comprising: removing the tube from the heat exchanger; applying a damage-resistant layer to an edge of the tube and along an inner surface of a portion of the tube that is positioned within the tube insertion aperture in the tubesheet at an inlet side of the heat exchanger; and inserting a replacement tube into tube insertion apertures in tubesheets of the heat exchanger.

In yet another aspect, there is provided a method of retrofitting a pre-existing tube-to-tubesheet joint, comprising: applying a damage-resistant layer to an edge of a tube and along an inner surface of a portion of the tube that is positioned within a tube insertion aperture in a tubesheet.

In an implementation, the damage-resistant layer can be applied along the inner surface of the at least one tube to a depth that corresponds to at least the width of the tubesheet. In an implementation, the damage-resistant layer can extend into the tube beyond the width of the tubesheet.

In an implementation, the tube can be rolled after being inserted into the tube insertion aperture to engage an inner surface of the tube insertion aperture. In an implementation, the tube can be welded to the tubesheet after being inserted into the tube insertion aperture.

In an implementation, the damage-resistant layer can interface with an edge of tubesheet cladding adjacent the edge of the at least one tube.

In an implementation, the tubesheet can include a plurality of tube insertion apertures and the assembly comprises a plurality of tubes. A pair of tubesheets and the plurality of tubes can be in a heat exchanger. The heat exchanger can be a shell and tube heat exchanger, condenser, air cooler, waste heat boiler, reheater, reboiler, preheater or boiler.

In an implementation, the damage-resistant layer can include an alloy or ceramic. The alloy can include stainless steel, nickel, cobalt, titanium, copper, tantalum or zirconium.

In an implementation, the damage-resistant layer can be applied using a welding technique, such as laser welding, electron-beam welding, electroslag welding, open-arc welding, or plasma welding.

In an implementation, the damage-resistant layer can be applied using a brazing technique.

In an implementation, the damage-resistant layer can be applied using a sintering technique.

In an implementation, the damage-resistant layer can be applied using a chemical vapor deposition technique.

In an implementation, the damage-resistant layer can be applied using a thermal spray technique.

In an implementation, the damage-resistant layer can be applied using a diffusion coating technique.

Advantages of applying the damage-resistant layer can include mitigating or eliminating damage to tube-to-tubesheet connections that are exposed to high temperatures, e.g., due to corrosion and other damage or degradation mechanisms.

BRIEF DESCRIPTION OF THE DRAWINGS

Embodiments will now be described with reference to the appended drawings wherein.

DETAILED DESCRIPTION

Figure 1:
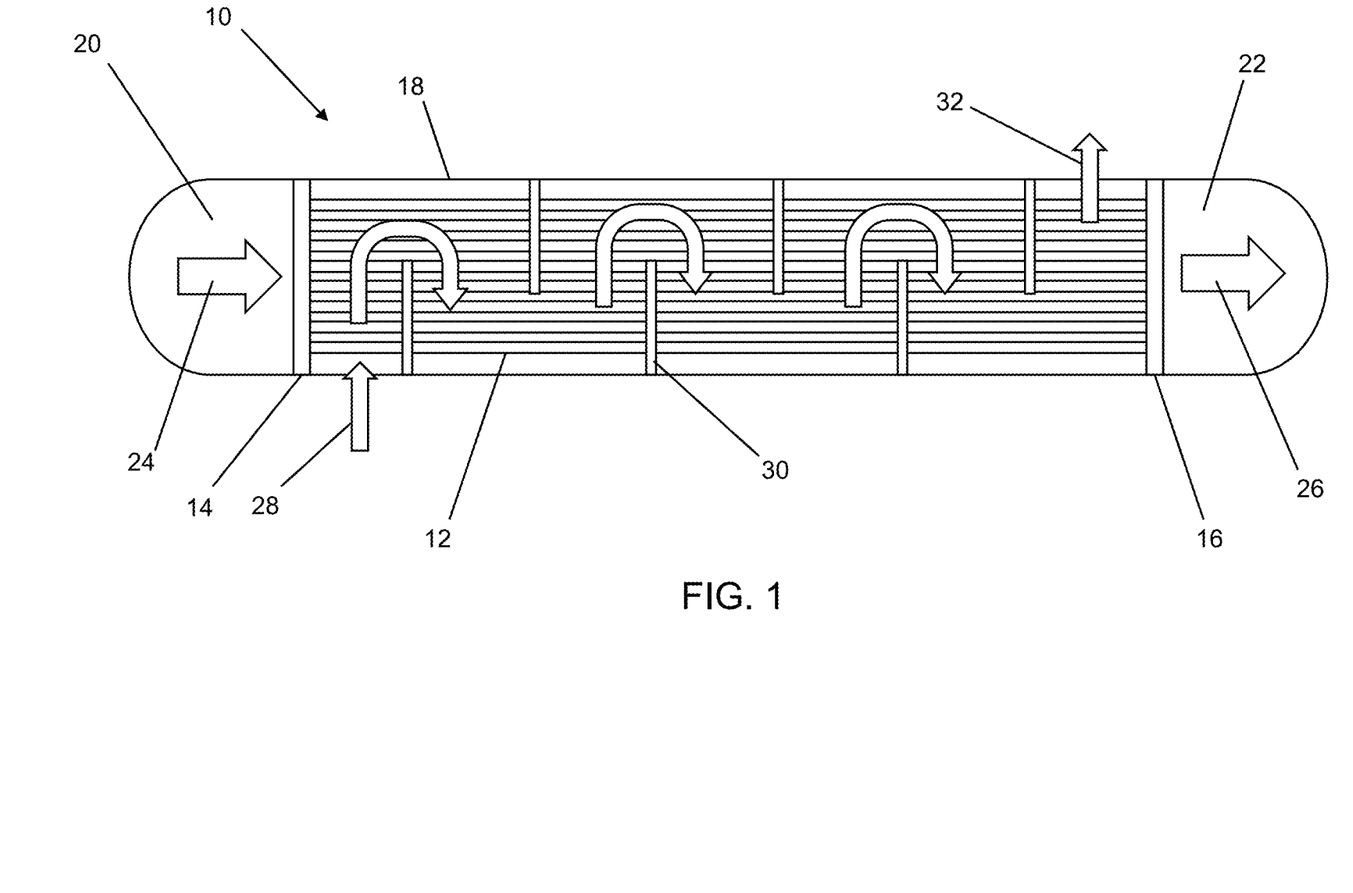
FIG. 1 is a schematic cross-sectional view of a shell and tube heat exchanger.

Referring now to the figures, FIG. 1 illustrates a shell and tube heat exchanger 10 that includes a set of tubes 12 extending between stationary tubesheets 14, 16. The first tubesheet 14 is positioned at an inlet side of the heat exchanger 10 and the second tubesheet 16 is positioned at the outlet side of the heat exchanger 10. The tubes 12 and tubesheets 14, 16, also referred to herein as a "tube and tubesheet assembly", are surrounded by a shell 18 that hermetically seals a volume surrounding the tubes 12. Inlet and outlet bonnets 20, 22 or "heads" are coupled to each end of the shell 18 to enable the ingress and egress of a fluid 24 such as a gas to/from the heat exchanger 10.

In the example configuration shown in FIG. 1, the shell 18 includes a series of baffles 30 to direct flow through the shell side in a winding or zigzag pattern. In operation, a fluid such as water is injected into an inlet port 28 and flows through the shell 18 around the tubes 12 towards an outlet port 32. This fluid that surrounds the tubes 12 cools the fluid (e.g., hot gas) that flows through the tubes 12 from the inlet bonnet 20 to the outlet bonnet 22 as is known in the art.

Figure 2:
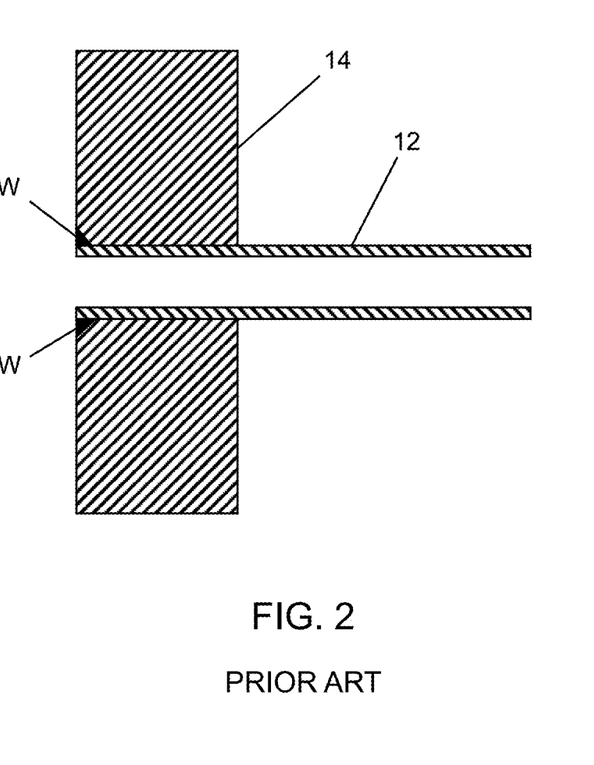
FIG. 2 is a cross-sectional view of a conventional tube-to-tubesheet welded joint.
Figure 3:
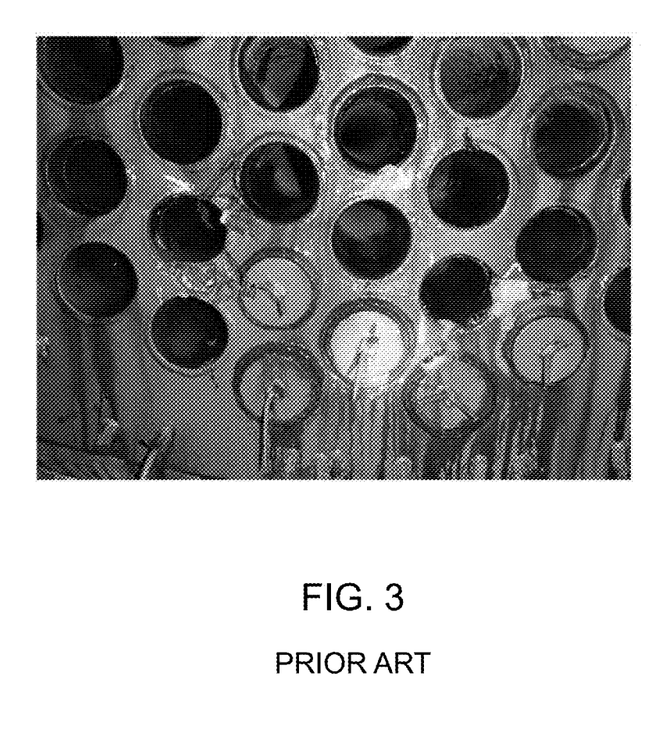
FIG. 3 is an image of corroded tube-to-tubesheet joints in a conventional heat exchanger.

FIG. 2 illustrates a conventional tube-to-tubesheet connection wherein the tube 12 is welded (W) to the tubesheet 14. As discussed above, conventional shell and tube heat exchangers 10 often use carbon steel tubes that have a welded joint (W) located at the hot-side face of the tubesheet 14. With this configuration, the tube ends and their welds are exposed to higher temperatures, which can result in higher corrosion rates and other forms of damage or degradation. FIG. 3 illustrates a typical corroded tube-to-tubesheet joint when sulfidation corrosion occurs. In FIG. 3 it can be seen that the leading edge of the tube appears to be thinned out first due to this corrosion.

To address the issues such as that illustrated in FIG. 3 and other forms of damage or degradation, a damage-resistant layer can be applied to an edge of a tube 12 to be joined to a tubesheet 14, and along an inner surface of a portion of the tube 12 that is positioned within the corresponding tube insertion aperture (also referred to as a tube insertion hole) of the tubesheet 14. An example of the inclusion of such a layer is shown in FIG. 4.

Figure 4:
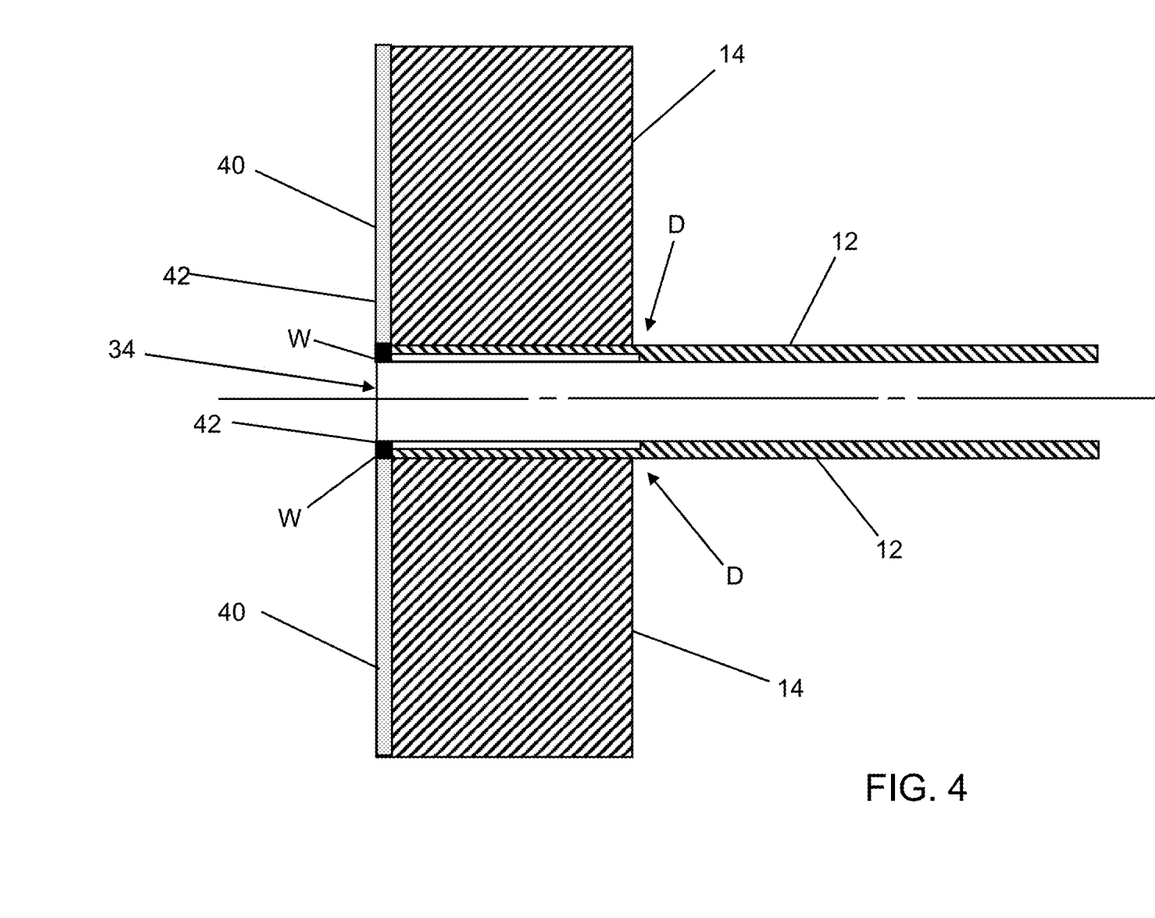
FIG. 4 is a cross-sectional view of a tube and tubesheet assembly with damage resistance.

In FIG. 4, a tube 12 is inserted into a tube insertion aperture 34 of a tubesheet 14. The tubesheet 14 in this example includes a cladding 40 on its outer face. A damage-resistant layer 42 has been applied to the tube 12 such that it extends from adjacent the cladding 40, to cover any exposed metal from the tube 12 at the hot intake, and the applied layer 42 continues over the edge of the tube 12 and over the inner surface of the tube 12 to a depth (D). The depth D can be chosen according to the economics and environment of the particular application. For example, in an application with high temperature gas being injected through the tubes 12, the damage-resistant layer 42 can be applied to the inner surface of the tube 12 up to or beyond the depth of the tubesheet 14 where the cooling effects of the fluid flowing through the shell 18 occurs. In this way, only a portion of the tube 12 needs to be cladded with the layer 42 while allowing for a lower cost tube 12 to be used, such as carbon steel. A weld (W) can also be applied to the interface between the cladding 40 and the layer 42 and the tube 12. It can be appreciated that the tube 12 can also be rolled when inserted into the tube insertion aperture 34. That is, the tube 12 can be rolled and/or welded at hot end of the tubesheet 14.

The damage-resistant layer 42 can include a corrosion-resistant alloy, such as austenitic stainless steel, nickel, cobalt, titanium, copper, tantalum or zirconium alloys, but can also comprise any metallic alloy or any metal oxide, nitride, or carbide (such as ceramics).

The damage-resistant layer 42 can be applied using a welding technique such as laser, electron-beam, electroslag, open-arc, or plasma, as well as other overlay processes such as brazing, sintering, thermal spray, diffusion coating, or chemical vapor deposition to name a few. The damage-resistant layer 42 is thus integrated into the surface of the tube 12 by fusing or metallurgical bonding, as shown in FIG. 4, such that the inner surface from the edge of the tube 12 to distance D along the inner surface of the tube 12 provides a consistent profile. Further, as visible in FIG. 4, the overlay process applies the damage-resistant layer 42 with such a consistent profile along the inner surface of the tube 12 so as to avoid creating a ridge at the interface between the layer 42 and the rest of the tube 12. That is, the inner diameter of the portion of the tube 12 that includes the layer 42 remains substantially the same as the inner diameter of the portion of the tube 12 without the layer 42.

Figure 5:
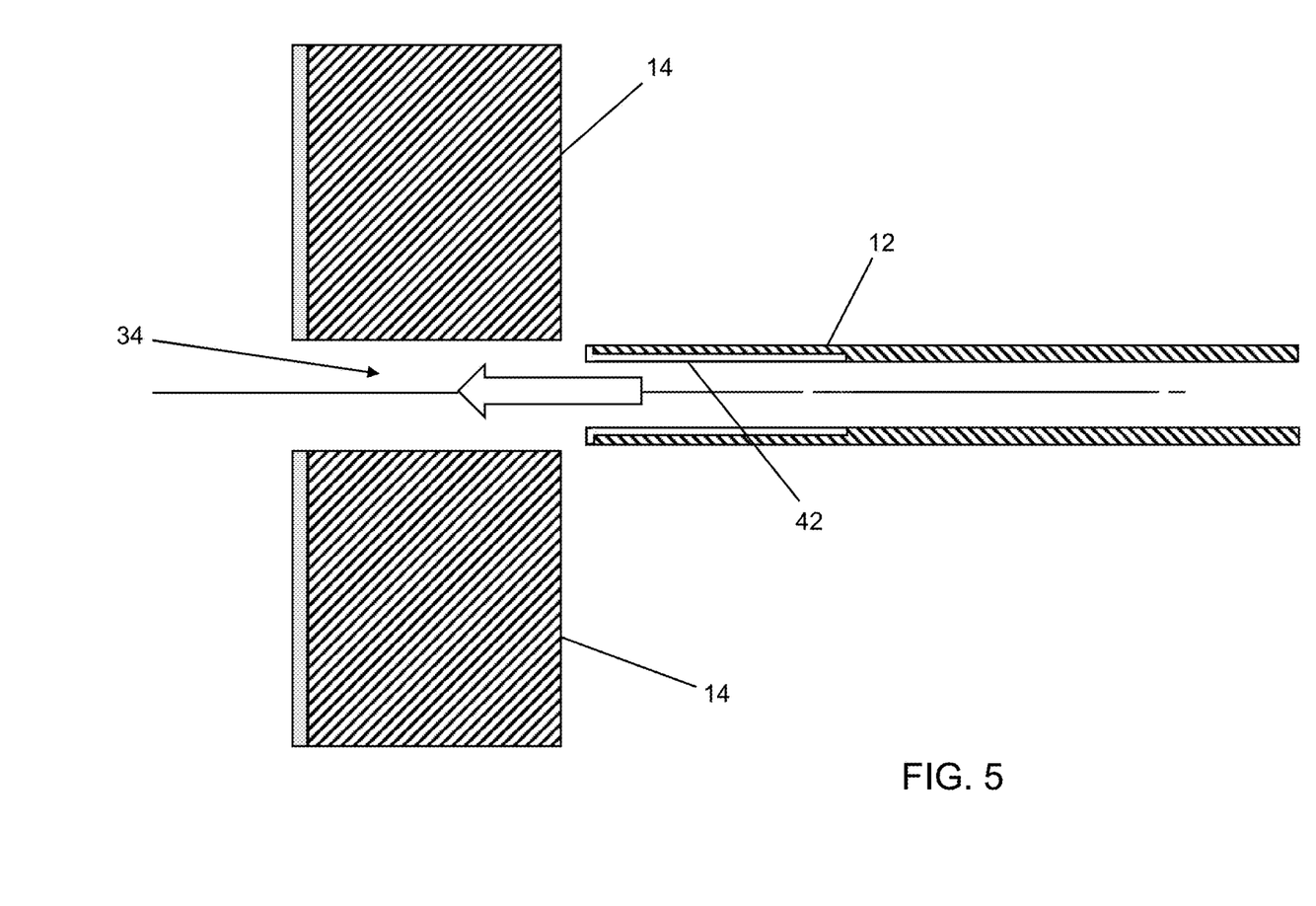
FIG. 5 is a cross-sectional view of a tube insertion operation in connecting a tube to a tubesheet.
Figure 6:
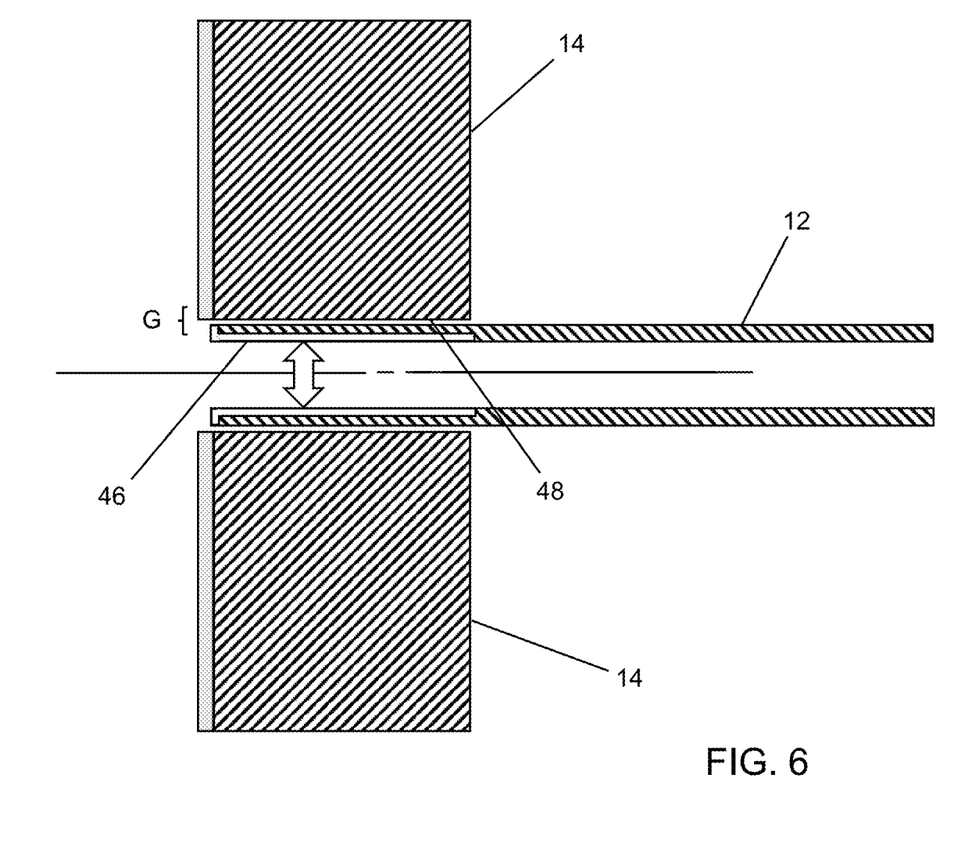
FIGS. 6 and 7 are cross-sectional views of a tube rolling operations in connecting a tube to a tubesheet.
Figure 7:
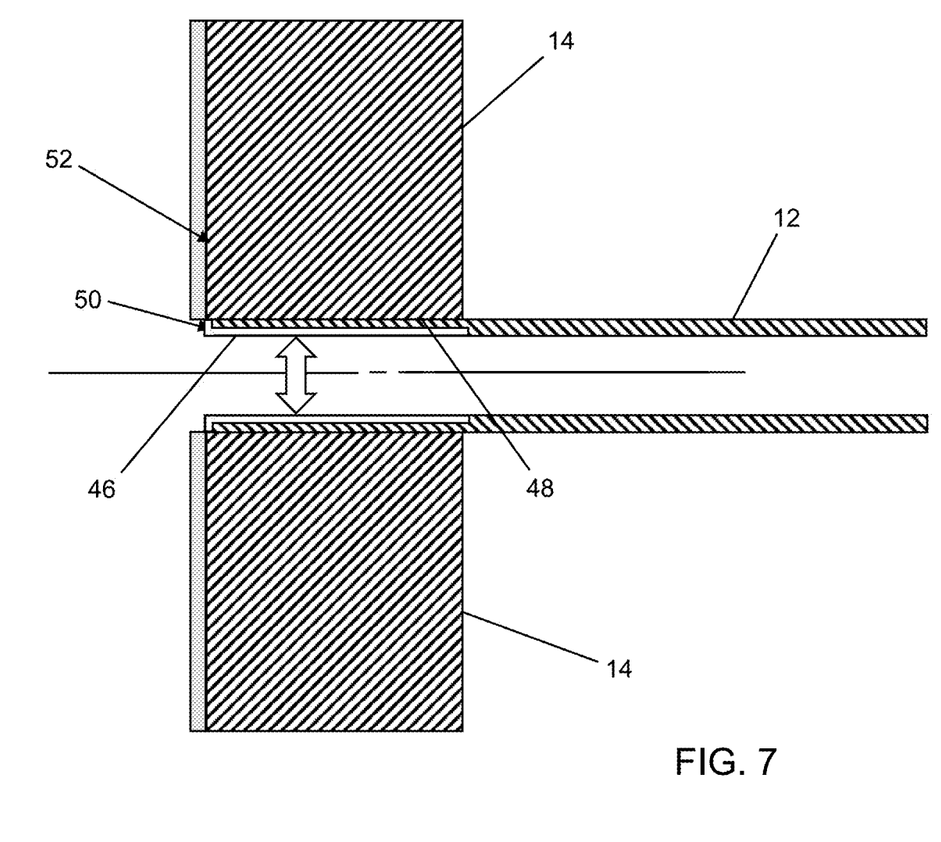

FIGS. 5 to 9 illustrate an example assembly process for inserting, securing, and protecting a tube-to-tubesheet joint. Referring first to FIG. 5, a tube 12 having the damage-resistant layer 42 applied can be inserted into a tube insertion aperture 34 in a tubesheet 14 with cladding 54 already applied. In this example, the outside diameter (OD) of the tube 12 is less than then inside diameter (ID) of the tube insertion aperture 34 to permit the tube 12 to slide into the aperture 34. As shown in FIGS. 6 and 7, the resultant gap (G) between the tube 12 and the inner surface 48 of the tube insertion aperture 34 can be closed by applying a tube rolling technique to effectively enlarge the tube 12 such that the OD of the tube 12 is substantially the same as the ID of the tube insertion aperture 34 to secure the tube 12 in place. Tube rolling is a technique that applies pressure against the inner surface 46 of the tube 12, e.g., by hydraulically powered rollers. It can be appreciated that if tubesheet cladding 54 has not yet been applied, it can be applied at this stage.

Figure 8:
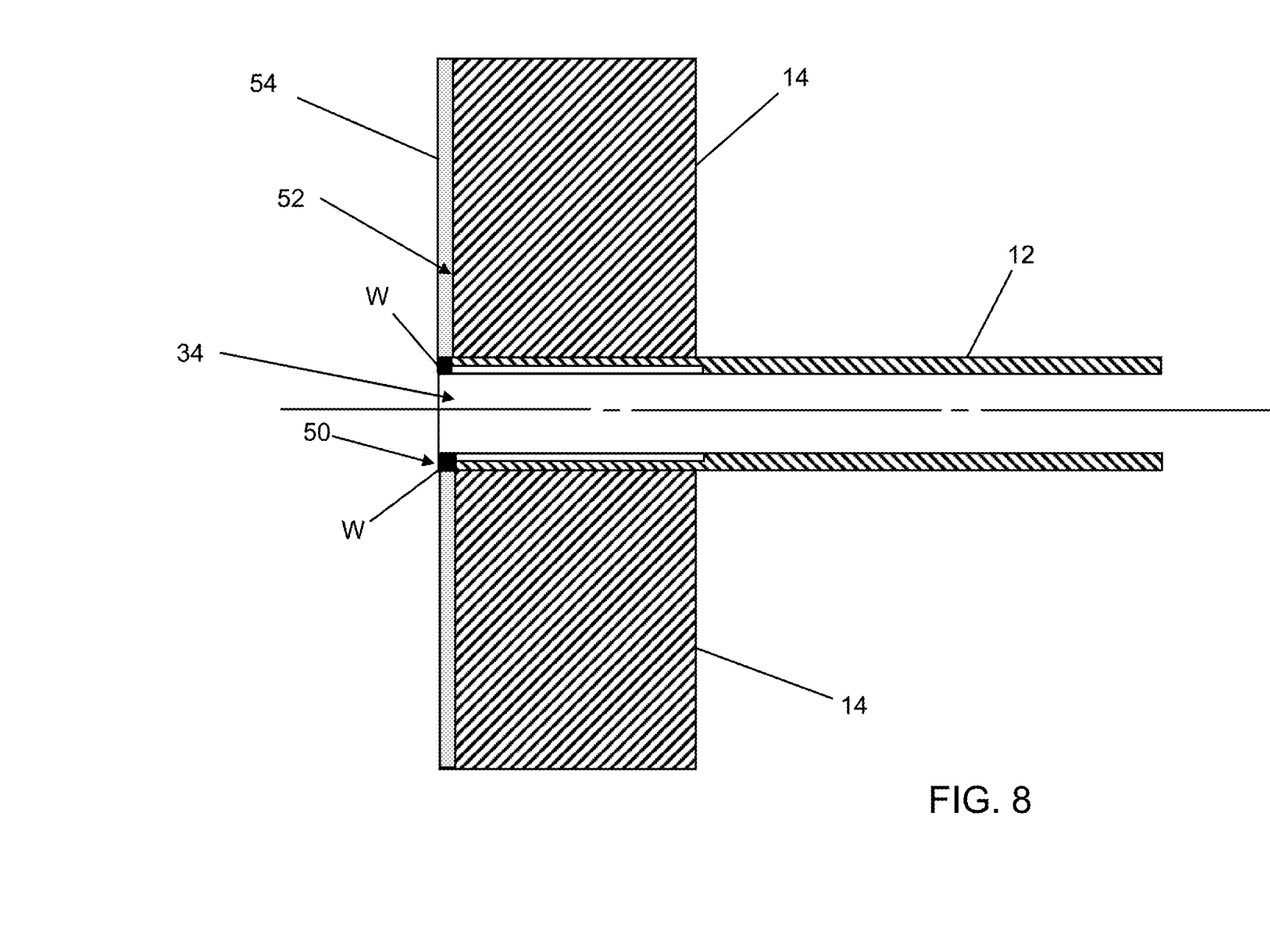
FIG. 8 is a cross-sectional view of a tube rolled in a tubesheet insertion aperture showing a weld being applied to the interface between the tube and tubesheet outer faces.

FIG. 8 illustrates an inserted tube 12 and cladding 54 already applied to the outer surface 52 of the tubesheet 14. Optionally, a weld (W) can be applied between the edge 50 of the tube 12 and the cladding 54. The edge 50 of the tube 12 and the portion of the tube 12 that is positioned within the tube insertion aperture 34 that would normally be exposed to the hot intake side of the tubesheet 14 is protected by the damage-resistant layer 42 that was applied to the tube 12 prior to the joint being made, in this example.

Figure 9:
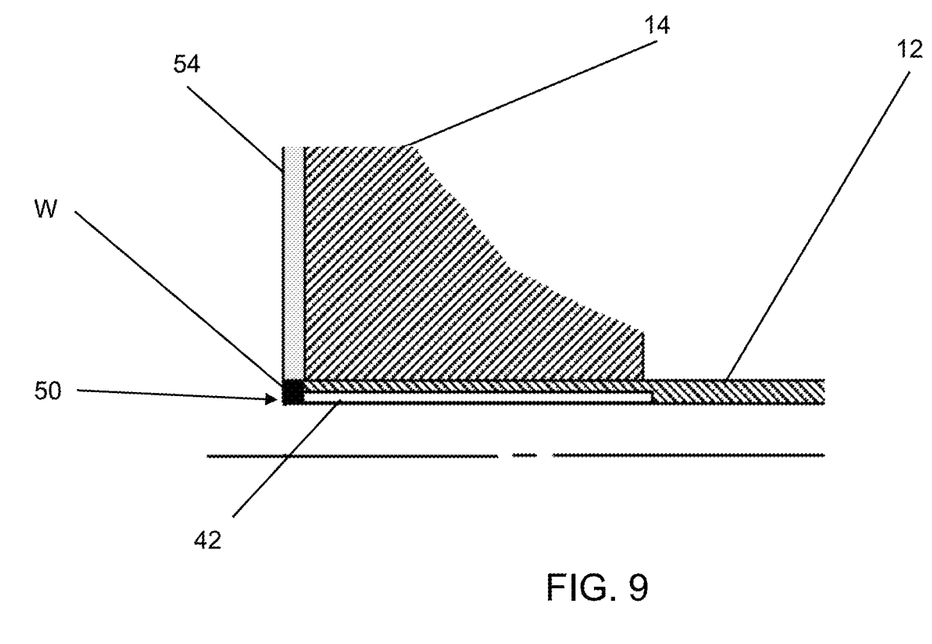
FIG. 9 is an enlarged cross-sectional view of the applied damage-resistant layer and weld applied between the layer and tubesheet cladding.

As seen in an enlarged view in FIG. 9, the damage-resistant layer 42 is applied adjacent to the edge of the cladding 54 to seal off the edge of the tube 12 from damaging exposure.

Figure 10:
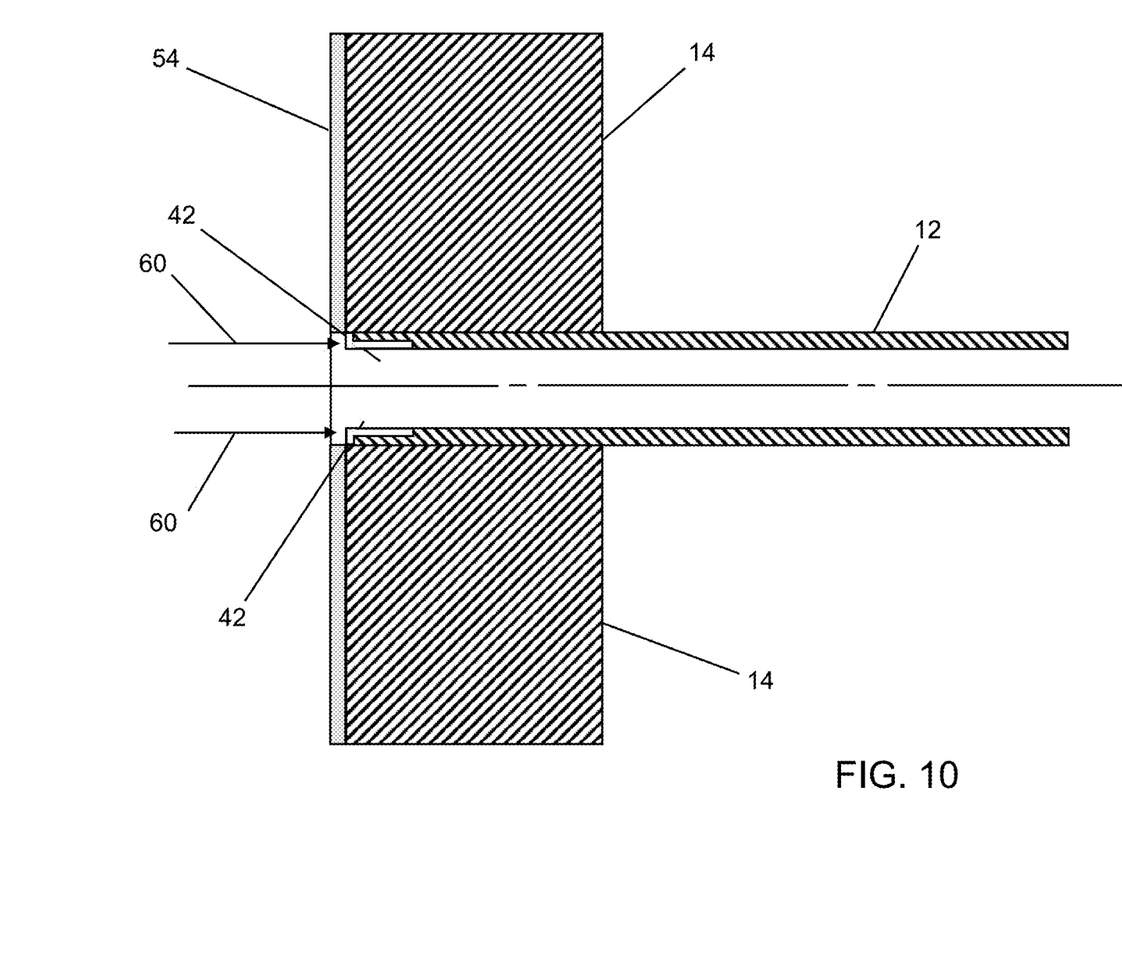
FIG. 10 is a cross-sectional view showing the application of a damage-resistant layer to the tube-to-tubesheet interface for an already inserted tube.

Referring now to FIG. 10, another example is shown in which a tube 12 is inserted and optionally rolled into the tube insertion aperture 34 of a tubesheet 14 prior to the damage-resistant layer 42 being applied. Once positioned in the tube insertion aperture 34 as shown in FIG. 10, an application process 60 (e.g., welding or overlay process) is utilized to apply the damage-resistant layer 42 in situ. It can be appreciated that only a portion of the layer 42 is shown in FIG. 10 to illustrate the application process 60 in progress.

Figure 11:
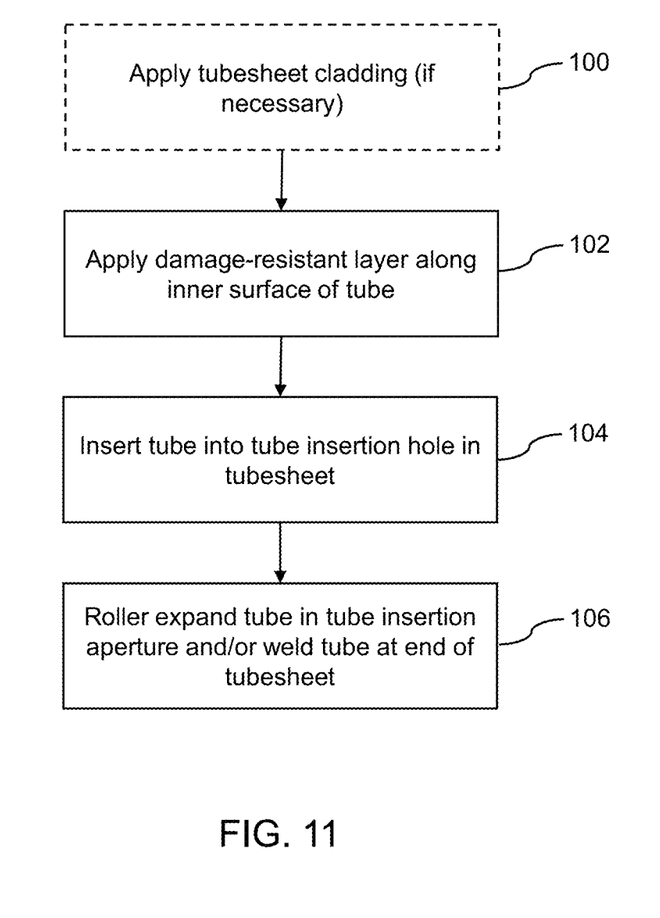
FIG. 11 is a flow chart illustrating operations performed in coupling a tube to a tubesheet.

The flowchart in FIG. 11 illustrates operations that can be performed in assembling a tube-to-tubesheet connection in which damage resistance is provided. It can be appreciated that this process can be applied at the inlet or hot end of a heat exchanger 10 or both the inlet and outlet ends, such that the method shown in FIG. 11 is implemented at each end of the tube 12. Optionally, if applicable, the tubesheet cladding 54 can be added to the tubesheet 14 at 100. At 102, the damage-resistant layer 42 is applied to the end of the tube 12 and along the inner surface 46 of the tube 12 at the outer end of the tubesheet connection. By "outer end", it is meant the surface or side of the tubesheet 14 that is outside of the shell 18. This terminology also applies when the process is implemented at the outlet end of the heat exchanger 10. At 104, the tube 12 is inserted into the tube insertion aperture 34 in the tubesheet 14 and at 106 the tube 12 can be rolled to engage the inner surface 48 of the tube insertion aperture 34 and/or welded, as shown in FIGS. 7 and 8. In this example, the damage-resistant layer 42 has been applied to the end of the tube 12 prior to the tube being inserted in the tube insertion aperture 34. However, it can be appreciated that, as shown in FIG. 10, the layer 42 can also be applied to a tube 12 that has already been inserted in the tube insertion aperture(s) 34.

Figure 12:
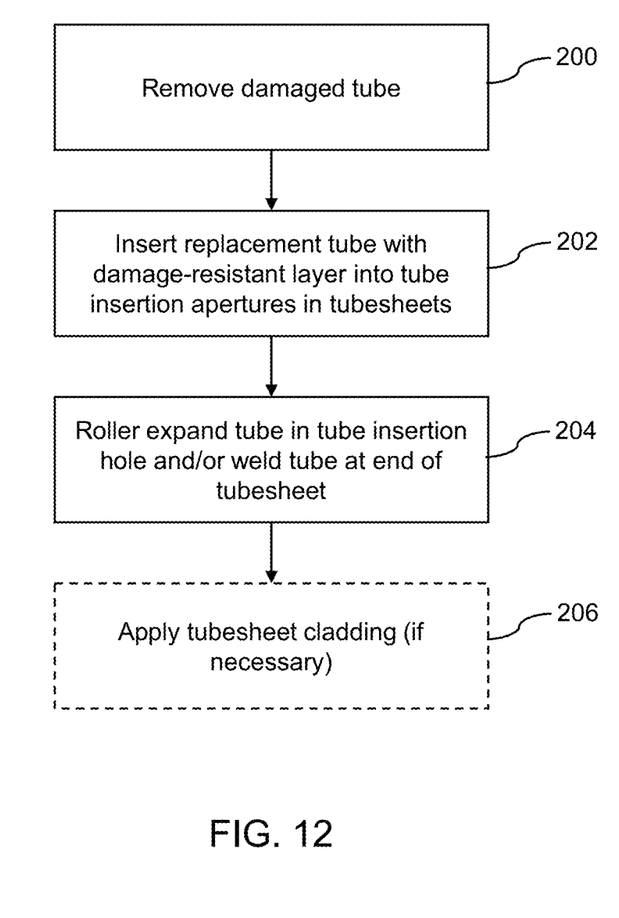
FIG. 12 is a flow chart illustrating operations performed in repairing a damaged tube in a shell and tube heat exchanger.

FIG. 12 illustrates operations that can be performed in retrofitting or repairing a heat exchanger 10 to incorporate the layer 42 for at least one tube 12. At 200 the damaged or otherwise to-be-replaced tube 12 is removed from the heat exchanger 10. At 202 a replacement tube 12 is inserted into the corresponding tube insertion apertures 34 in the tubesheets 14, 16. The tube 12 can be rolled at 204 to engage the inner surface 48 of the tube insertion aperture 34 and/or welded as with an original installation. If necessary, tubesheet cladding 54 can be added at 206. Similar to the above, the damage-resistant layer 42 in this example has been applied to the end of the tube 12 prior to the tube being inserted in the tube insertion aperture 34. However, it can be appreciated that, as shown in FIG. 10, the layer 42 can also be applied to a tube 12 that has already been inserted in the tube insertion aperture(s) 34.

It can be appreciated that operation 102 can also be applied to retrofit an existing heat exchanger 10, even if a tube 12 is not damaged or replaced. In this case, operation 102 is applied over the existing connection to provide corrosion resistance at the exposed hot end of the tube 12.

It can also be appreciated that the principles discussed herein can be applied to any heat exchanger or other industrial equipment that includes a tube and tubesheet connection. For example, the processes discussed above can be applied to any processing plant, and any type of equipment such as boilers and air-coolers, or configurations where tubes 12 are connected to tubesheets 14, and where a layer can be provided to protect the tubes 12 from damage mechanisms such as corrosion from high temperature sulfidation, leading edge erosion, and other damage or degradation mechanisms as herein discussed.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A tube and tubesheet assembly, comprising:
   a tubesheet, the tubesheet comprising at least one tube insertion aperture therethrough;
   at least one tube inserted in the at least one tube insertion aperture; and
   an overlaid damage-resistant layer integrated into a surface of an edge of the at least one tube and along an inner surface of a portion of the tube that is positioned within the corresponding tube insertion aperture, wherein the inner diameter of the portion of the tube that includes the damage-resistant layer remains the same as the inner diameter of the portion of the tube without the damage-resistant layer, and wherein the outer diameter of the portion of the tube that includes the damage-resistant layer remains the same as the outer diameter of the portion of the tube without the damage-resistant layer.

2. The assembly of claim 1, wherein the damage-resistant layer is overlaid along the inner surface of the at least one tube to a depth that corresponds to at least the width of the tubesheet.

3. The assembly of claim 2, wherein the overlaid damage-resistant layer extends into the tube beyond the width of the tubesheet.

4. The assembly of claim 1, wherein the tube is rolled after being inserted into the tube insertion aperture to engage an inner surface of the tube insertion aperture.

5. The assembly of claim 1, wherein the tube is welded to the tubesheet after being inserted into the tube insertion aperture.

6. The assembly of claim 1, wherein the overlaid damage-resistant layer interfaces with an edge of tubesheet cladding adjacent the edge of the at least one tube.

7. The assembly of claim 1, wherein the tubesheet comprises a plurality of tube insertion apertures and the assembly comprises a plurality of tubes.

8. The assembly of claim 7, wherein a pair of tubesheets and the plurality of tubes are in a heat exchanger.

9. The assembly of claim 8, wherein the heat exchanger is a shell and tube heat exchanger, condenser, air cooler, waste heat boiler, reheater, reboiler, preheater or boiler.

10. The assembly of claim 1, wherein the overlaid damage-resistant layer comprises an alloy or ceramic.

11. The assembly of claim 10, wherein the alloy comprises stainless steel, nickel, cobalt, titanium, copper, tantalum or zirconium.

12. The assembly of claim 1, wherein the damage-resistant layer is overlaid using a welding technique.

13. The assembly of claim 12, wherein the welding technique comprises laser welding, electron-beam welding, electroslag welding, open-arc welding, or plasma welding.

14. The assembly of claim 1, wherein the damage-resistant layer is overlaid using a brazing technique.

15. The assembly of claim 1, wherein the damage-resistant layer is overlaid using a sintering technique.

16. The assembly of claim 1, wherein the damage-resistant layer is overlaid using a chemical vapor deposition technique.

17. The assembly of claim 1, wherein the damage-resistant layer is overlaid using a thermal spray technique.

18. The assembly of claim 1, wherein the damage-resistant layer is overlaid using a diffusion coating technique.

19. A heat exchanger, comprising:
   a pair of tubesheets;
   a plurality of tubes extending between the pair of tubesheets, each tube being inserted in the tubesheets at respective tube insertion apertures; and
   for at least one tube-to-tubesheet connection, an overlaid damage-resistant layer integrated into a surface of an edge of the corresponding tube and along an inner surface of a portion of the corresponding tube that is positioned within the corresponding tube insertion aperture, wherein the inner diameter of the portion of the tube that includes the damage-resistant layer remains the same as the inner diameter of the portion of the tube without the damage-resistant layer, and wherein the outer diameter of the portion of the tube that includes the damage-resistant layer remains the same as the outer diameter of the portion of the tube without the damage-resistant layer.

20. A method of coupling a tube to a tubesheet, comprising:
   overlaying a damage-resistant layer to be integrated into a surface of an edge of the tube and along an inner surface of a portion of the tube that is positioned within a tube insertion aperture in the tubesheet, such that the inner diameter of the portion of the tube that includes the damage-resistant layer remains the same as the inner diameter of the portion of the tube without the damage-resistant layer, and wherein the outer diameter of the portion of the tube that includes the damage-resistant layer remains the same as the outer diameter of the portion of the tube without the damage-resistant layer.

21. A method of repairing a tube in a heat exchanger, comprising:
   removing the tube from the heat exchanger;
   overlaying a damage-resistant layer to be integrated into a surface of an edge of the tube and along an inner surface of a portion of the tube that is positioned within a tube insertion aperture in a tubesheet at an inlet side of the heat exchanger, such that the inner diameter of the portion of the tube that includes the damage-resistant layer remains the same as the inner diameter of the portion of the tube without the damage-resistant layer, and such that the outer diameter of the portion of the tube that includes the damage-resistant layer remains the same as the outer diameter of the portion of the tube without the damage-resistant layer, the tube having the overlaid damage-resistant layer forming a replacement tube; and
   inserting the replacement tube into the tube insertion aperture in the tubesheet of the heat exchanger.

22. A method of retrofitting a pre-existing tube-to-tubesheet joint, comprising:
   overlaying a damage-resistant layer to be integrated into a surface of an edge of a tube and along an inner surface of a portion of the tube that is positioned within a tube insertion aperture in a tubesheet, such that the inner diameter of the portion of the tube that includes the damage-resistant layer remains the same as the inner diameter of the portion of the tube without the damage-resistant layer, and such that the outer diameter of the portion of the tube that includes the damage-resistant layer remains the same as the outer diameter of the portion of the tube without the damage-resistant layer.

23. The heat exchanger of claim 19, wherein the damage-resistant layer is overlaid along the inner surface of at least one tube of the plurality of tubes to a depth that corresponds to at least the width of at least one of the tubesheets.

24. The heat exchanger of claim 23, wherein the overlaid damage-resistant layer extends into the at least one tube beyond the width of the at least one of the tubesheets.

25. The heat exchanger of claim 19, wherein at least one of the plurality of tubes is rolled after being inserted into the respective tube insertion aperture to engage an inner surface of the respective tube insertion aperture.

26. The heat exchanger of claim 19, wherein at least one of the plurality of tubes is welded to at least one of the tubesheets after being inserted into the respective tube insertion aperture.

27. The heat exchanger of claim 19, wherein the overlaid damage-resistant layer interfaces with an edge of tubesheet cladding adjacent the edge of at least one of the plurality of tubes.

28. The heat exchanger of claim 19, wherein the heat exchanger is a shell and tube heat exchanger, condenser, air cooler, waste heat boiler, reheater, reboiler, preheater or boiler.

29. The heat exchanger of claim 19, wherein the overlaid damage-resistant layer comprises an alloy or ceramic.

30. The heat exchanger of claim 29, wherein the alloy comprises stainless steel, nickel, cobalt, titanium, copper, tantalum or zirconium.

31. The heat exchanger of claim 19, wherein the damage-resistant layer is overlaid using a welding technique.

32. The heat exchanger of claim 31, wherein the welding technique comprises laser welding, electron-beam welding, electroslag welding, open-arc welding, or plasma welding.

33. The heat exchanger of claim 19, wherein the damage-resistant layer is overlaid using one of: a brazing technique, a sintering technique, a chemical vapor deposition technique, and a diffusion coating technique.

34. The heat exchanger of claim 19, wherein the damage-resistant layer is overlaid using a thermal spray technique.

35. The method of claim 20, wherein overlaying the damage-resistant layer comprises overlying the damage resistant layer along the inner surface of the at least one tube to a depth that corresponds to at least the width of the tubesheet.

36. The method of claim 35, wherein overlaying the damage-resistant layer comprises extending the damage-resistant layer into the tube beyond the width of the tubesheet.

37. The method of claim 20, further comprising rolling the tube after being inserted into the tube insertion aperture to engage an inner surface of the tube insertion aperture.

38. The method of claim 20, further comprising welding the tube to the tubesheet after being inserted into the tube insertion aperture.

39. The method of claim 20, wherein overlaying the damage-resistant layer comprises interfacing the damage-resistant layer with an edge of tubesheet cladding adjacent the edge of the at least one tube.

40. The method of claim 20, wherein the tubesheet comprises a plurality of tube insertion apertures and an assembly comprising the tubesheet comprises a plurality of tubes.

41. The method of claim 40, wherein a pair of tubesheets and the plurality of tubes are in a heat exchanger.

42. The method of claim 41, wherein the heat exchanger is a shell and tube heat exchanger, condenser, air cooler, waste heat boiler, reheater, reboiler, preheater or boiler.

43. The method of claim 20, wherein the overlaid damage-resistant layer comprises an alloy or ceramic.

44. The method of claim 43, wherein the alloy comprises stainless steel, nickel, cobalt, titanium, copper, tantalum or zirconium.

45. The method of claim 20, wherein overlaying the damage-resistant layer comprises using a welding technique.

46. The method of claim 45, wherein the welding technique comprises laser welding, electron-beam welding, electroslag welding, open-arc welding, or plasma welding.

47. The method of claim 20, wherein overlaying the damage-resistant layer comprises using one of: a brazing technique, a sintering technique, a chemical vapor deposition technique, and a diffusion coating technique.

48. The method of claim 20, wherein overlaying the damage-resistant layer comprises using a thermal spray technique.

49. The method of claim 21, wherein overlaying the damage-resistant layer comprises overlaying the damage-resistant layer along the inner surface of the tube to a depth that corresponds to at least the width of the tubesheet.

50. The method of claim 21, wherein overlaying the damage-resistant layer comprises extending the damage-resistant layer into the tube beyond the width of the tubesheet.

51. The method of claim 21, further comprising rolling the tube after being inserted into the tube insertion aperture to engage an inner surface of the tube insertion aperture.

52. The method of claim 21, further comprising welding the tube to the tubesheet after being inserted into the tube insertion aperture.

53. The method of claim 21, wherein overlaying the damage-resistant layer comprises interfacing the damage-resistant layer with an edge of tubesheet cladding adjacent the edge of the tube.

54. The method of claim 21, wherein the tubesheet comprises a plurality of tube insertion apertures and the heat exchanger comprises a plurality of tubes.

55. The method of claim 21, wherein the overlaid damage-resistant layer comprises an alloy or ceramic.

56. The method of claim 55, wherein the alloy comprises stainless steel, nickel, cobalt, titanium, copper, tantalum or zirconium.

57. The method of claim 21, wherein overlaying the damage-resistant layer comprises using a welding technique.

58. The method of claim 57, wherein the welding technique comprises laser welding, electron-beam welding, electroslag welding, open-arc welding, or plasma welding.

59. The method of claim 21, wherein overlaying the damage-resistant layer comprises using one of: a brazing technique, a sintering technique, a chemical vapor deposition technique, and a diffusion coating technique.

60. The method of claim 21, wherein overlaying the damage-resistant layer comprises using a thermal spray technique.

61. The method of claim 21, wherein the heat exchanger is a shell and tube heat exchanger, condenser, air cooler, waste heat boiler, reheater, reboiler, preheater or boiler.

62. The method of claim 22, wherein overlaying the damage-resistant layer comprises overlaying the damage-resistant layer along the inner surface of the tube to a depth that corresponds to at least the width of the tubesheet.

63. The method of claim 62, wherein overlaying the damage-resistant layer comprises extending the damage-resistant layer into the tube beyond the width of the tubesheet.

64. The method of claim 22, wherein overlaying the damage-resistant layer comprises interfacing the damage-resistant layer with an edge of tubesheet cladding adjacent the edge of the tube.

65. The method of claim 22, wherein an assembly comprising the tubesheet comprises a plurality of tube-to-tubesheet joints.

66. The method of claim 65, wherein the plurality of tube-to-tubesheet joints are in a heat exchanger.

67. The method of claim 66, wherein the heat exchanger is a shell and tube heat exchanger, condenser, air cooler, waste heat boiler, reheater, reboiler, preheater or boiler.

68. The method of claim 22, wherein the overlaid damage-resistant layer comprises an alloy or ceramic.

69. The method of claim 68, wherein the alloy comprises stainless steel, nickel, cobalt, titanium, copper, tantalum or zirconium.

70. The method of claim 22, wherein overlaying the damage-resistant layer comprises using a welding technique.

71. The method of claim 70, wherein the welding technique comprises laser welding, electron-beam welding, electroslag welding, open-arc welding, or plasma welding.

72. The method of claim 22, wherein overlaying the damage-resistant layer comprises using one of: a brazing technique, a sintering technique, a chemical vapor deposition technique, and a diffusion coating technique.

73. The method of claim 22, wherein overlaying the damage-resistant layer comprises using a thermal spray technique.

74. The method of claim 22, further comprising, prior to overlaying the damage-resistant layer, removing the tube from the tubesheet.

75. The method of claim 22, further comprising, following overlaying the damage-resistant layer, replacing the tube in the tubesheet.

76. The method of claim 75, further comprising rolling the tube after being inserted into the tube insertion aperture to engage an inner surface of the tube insertion aperture.

77. The method of claim 75, further comprising welding the tube to the tubesheet after being inserted into the tube insertion aperture.

78. The method of claim 22, further comprising:
removing a pre-existing tube from the pre-existing tube-to-tubesheet connection; and
replacing the pre-existing tube with the tube having the overlaid damage-resistant layer.

79. The method of claim 22, further comprising, prior to overlaying the damage-resistant layer, inserting the tube in the tube insertion aperture.

* * * * *